Feb. 17, 1931.  V. G. APPLE  1,792,525
ELECTRIC MOTOR AUTOMOTIVE WHEEL
Filed May 4, 1928  5 Sheets-Sheet 1

INVENTOR
Vincent G. Apple

Feb. 17, 1931. V. G. APPLE 1,792,525
ELECTRIC MOTOR AUTOMOTIVE WHEEL
Filed May 4, 1928 5 Sheets-Sheet 2

INVENTOR
Vincent G. Apple
BY

Feb. 17, 1931.    V. G. APPLE    1,792,525
ELECTRIC MOTOR AUTOMOTIVE WHEEL
Filed May 4, 1928    5 Sheets-Sheet 3
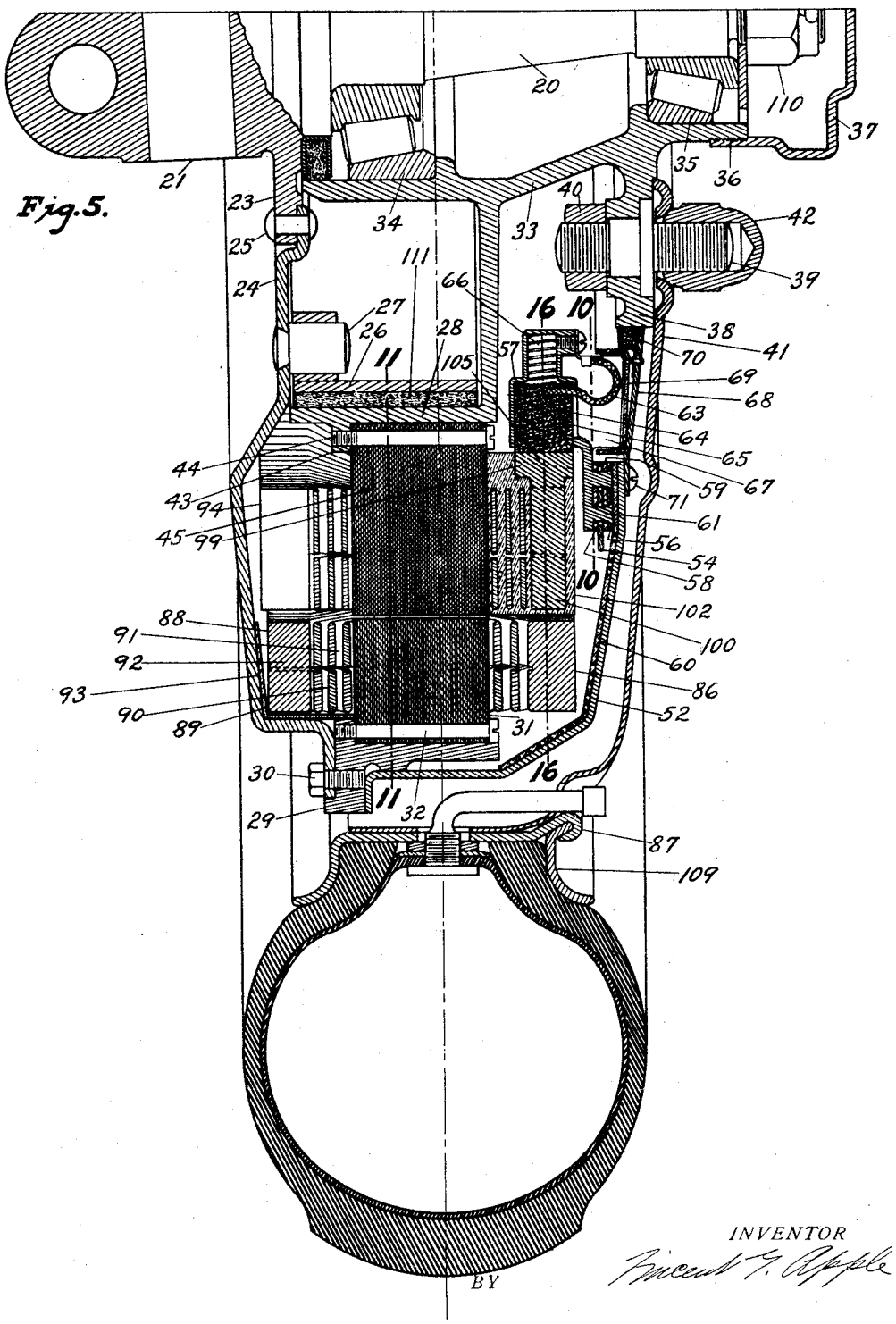

Feb. 17, 1931.  V. G. APPLE  1,792,525
ELECTRIC MOTOR AUTOMOTIVE WHEEL
Filed May 4, 1928   5 Sheets-Sheet 4
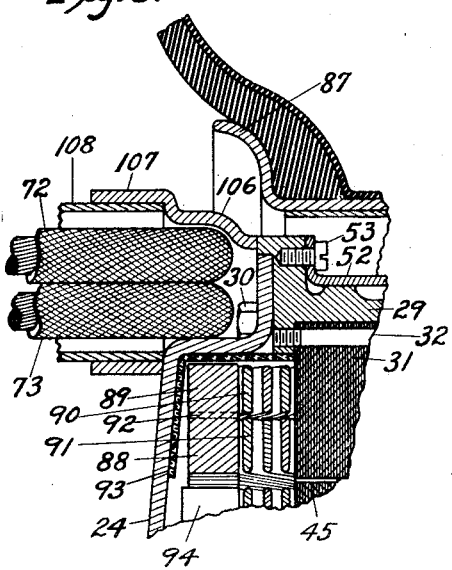
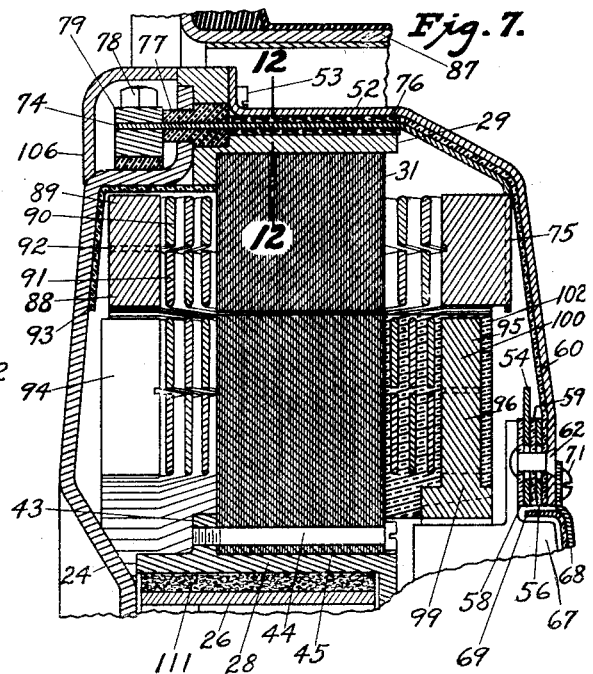
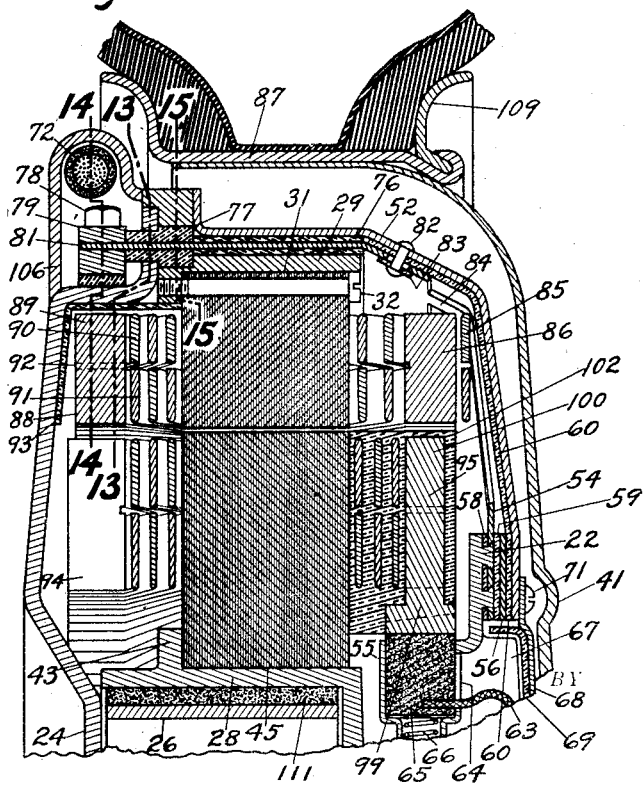
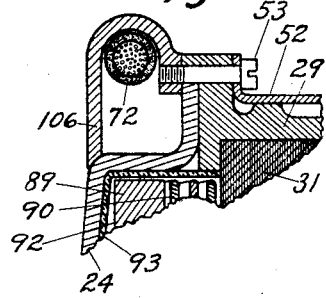

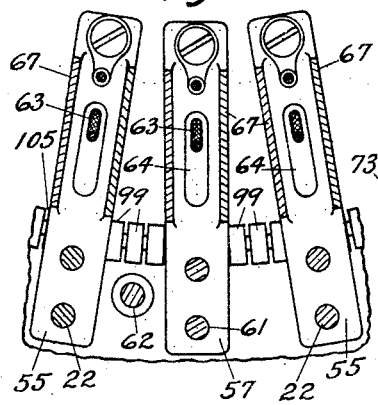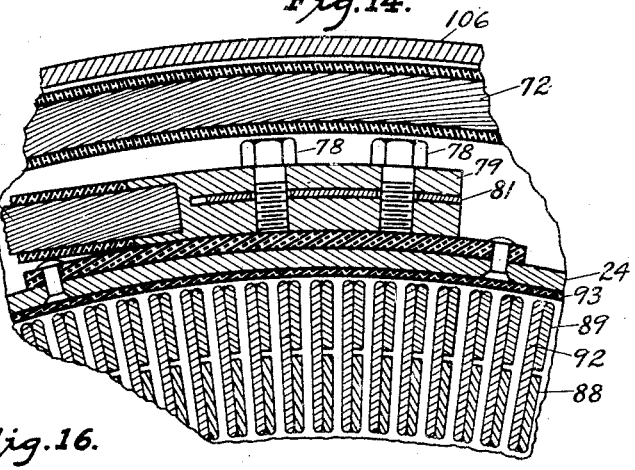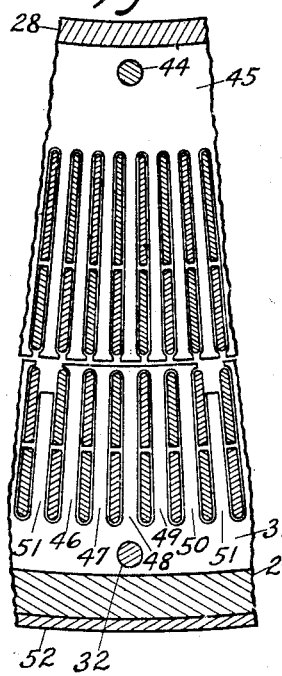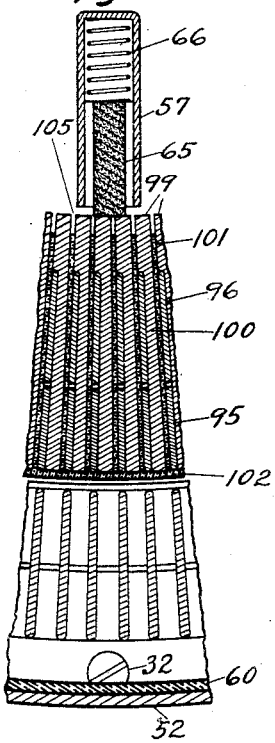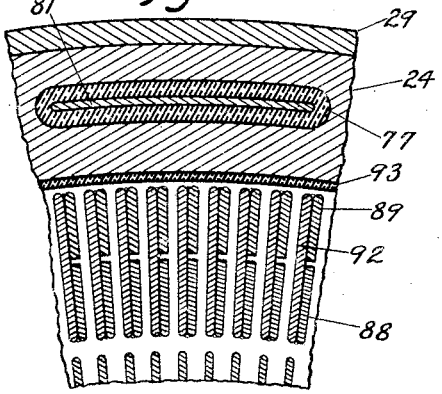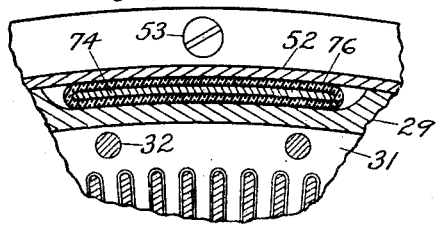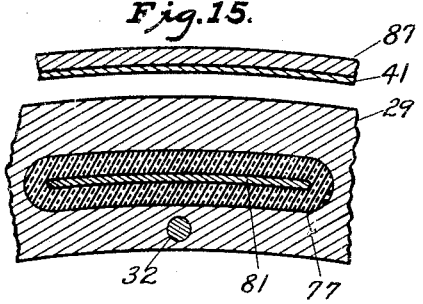

Patented Feb. 17, 1931

1,792,525

UNITED STATES PATENT OFFICE

VINCENT G. APPLE, OF DAYTON, OHIO

ELECTRIC-MOTOR AUTOMOTIVE WHEEL

Application filed May 4, 1928. Serial No. 275,184.

My invention relates to improvements in electric motor automotive wheels in which a separate electric motor is provided for each wheel and one of the objects of my invention is to provide a sufficiently powerful electric motor of exceptionally small dimensions, so that it may be contained in the space within the wheel, which space is not, in present practice, used for any other purpose.

Another object is to provide an electric motor having an exceptionally rigid field, so that considerable change in torque and speed may be had, in either direction of running, with fixed brush positions.

Still another object is to combine an electric motor of the character indicated with a wheel and spindle of somewhat standard structure in such a manner as will not affect the ease with which whole wheels, tires, bearings, etc., are now removed, repaired, and again replaced in present structures, and yet have the motor parts readily accessible for inspection or repair.

I attain these objects by the mechanism illustrated in the accompanying drawings in which—

Fig. 5 is a cross section taken at 5—5, Figs. 1, 2, 3 and 4.

Fig. 6 is a cross section taken at 6—6, Figs. 1, 2, 3 and 4.

Fig. 7 is a cross section taken at 7—7, Figs. 1, 2, 3 and 4.

Fig. 8 is a cross section taken at 8—8, Figs. 1, 2, 3 and 4.

Fig. 9 is a cross section taken at 9—9, Figs. 1, 2, 3 and 4.

Fig. 10 is a fragmentary cross section taken at 10—10 Fig. 5.

Fig. 11 is a fragmentary cross section taken at 11—11 Fig. 5.

Fig. 12 is a fragmentary cross section taken at 12—12 Fig. 7.

Fig. 13 is a fragmentary cross section taken at 13—13 Fig. 8.

Fig. 14 is a fragmentary cross section taken at 14—14 Fig. 8.

Fig. 15 is a fragmentary cross section taken at 15—15 Fig. 8.

Fig. 16 is a fragmentary cross section taken at 16—16 Fig. 5.

Similar numerals refer to similar parts thruout the several views.

Figure 1:
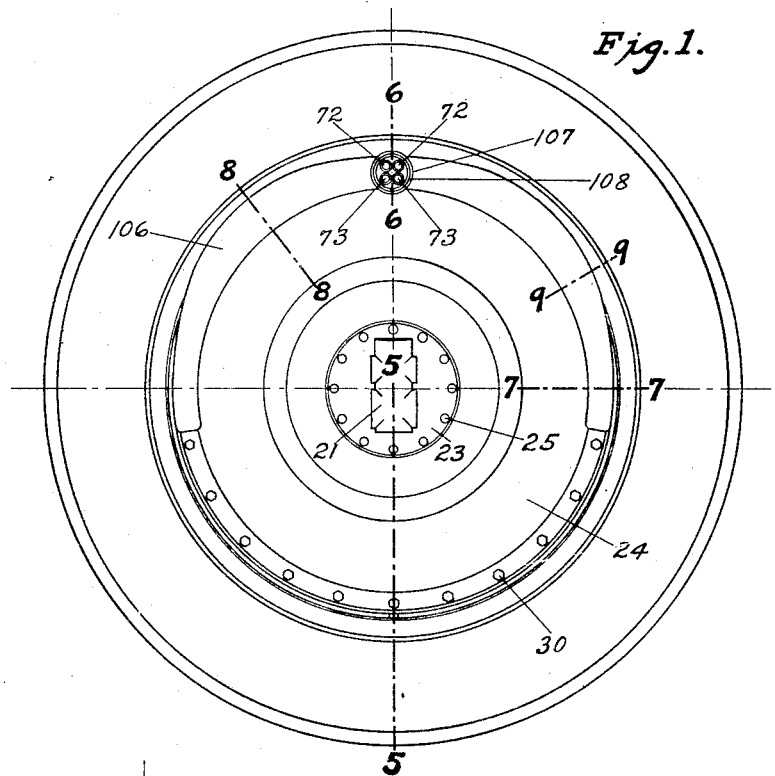
Fig. 1 is an elevation of the complete wheel viewed from the side next to the vehicle.

In the particular embodiment of my invention which I show in the drawing, the spindle 20 (see Fig. 5) is substantially as standardized for front wheels of motor vehicles, having the usual knuckle 21, about the center of which the spindle may be turned to guide the vehicle. It is, however, obvious that the wheel is equally applicable to a rigid axle whereof the spindle is an integral part or to which it is in some manner rigidly secured, or the spindle may extend thru the hub cap 37 and have support on both sides of the wheel if desired.

The flange 23, shown integral with spindle 20, is substantially as used in common practice where a brake is employed in connection with the wheel. The cover 24 which is secured to flange 23 by rivets 25, and which ordinarily carries only the brake shoe 26 on stud 27 and the brake cam (not shown), in the instant case is extended to a diameter considerably beyond that of the brake drum 28 and is also considerably heavier than ordinarily employed.

A ring 29 is secured to cover 24 by screws 30, and, in a bored opening of this ring 29, the field core lamina 31 are held by screws 32 in concentric relation with spindle 20, and against rotation thereabout.

The hub 33 (see Fig. 5) is, to a considerable extent, used in ordinary practice, having a seat for roller bearing 34 and another for roller bearing 35, threads 36 for hub cap 37, and a flange 38 in which studs 39 are held by nuts 40 to drive a removable disc wheel 41 thru nuts 42. This disc 41 and rim 87 are well known types, are patented to others, and are in commercial use. In the embodiment shown, however, the usual hub structure is extended by including as part of the hub the brake drum 28. The drum 28 carries an outwardly extending flange 43 into which screws 44 extend to hold armature core lamina 45 concentrically supported, the lamina 45 being thus rotatable about spindle 20.

Since it is desirable that the width of the motor should not exceed the width of the tire employed on the wheel, the motor dimensions in the embodiment shown, are limited to substantially this width, and to a diameter having suitable clearance within the rim. To attain the maximum torque-speed in these limited dimensions, a bar winding is preferably employed on both the armature and field cores, the type of winding herein shown, and the method by which it is applied, being shown and described in my Patents Nos. 1,224,518, 1,238,959 and 1,275,195.

Now in order that the greater torque may be had at the lower speeds, the motor is series wound, and, in order to lower the range of speed at which the motor operates, a large number of field poles are employed.

In the structure shown, the field comprises thirty-eight poles, the field core lamina 31 having two hundred and twenty-eight winding apertures, or six for each pole. The armature core lamina 45 are provided with two hundred and twenty-seven apertures and may thus be wound for thirty-eight poles, six turns per pole, this odd number of winding apertures being suitable for a progressive, single closed, wave connected bar winding, which as is well known, comprises a circuit in two substantially equal parallel paths.

Now, it is desirable that the field winding be also in two equal parallel paths, but, since the field core has an even number of poles and an equal number of winding apertures in each pole, the total number of winding apertures is necessarily an even number, so the winding may not be satisfactorily connected as a single closed wave winding like that employed in the armature. The field winding may be lap connected as in ordinary practice, but then there will be as many parallel paths in the winding as there are poles, in the present case thirty-eight.

Figure 4:
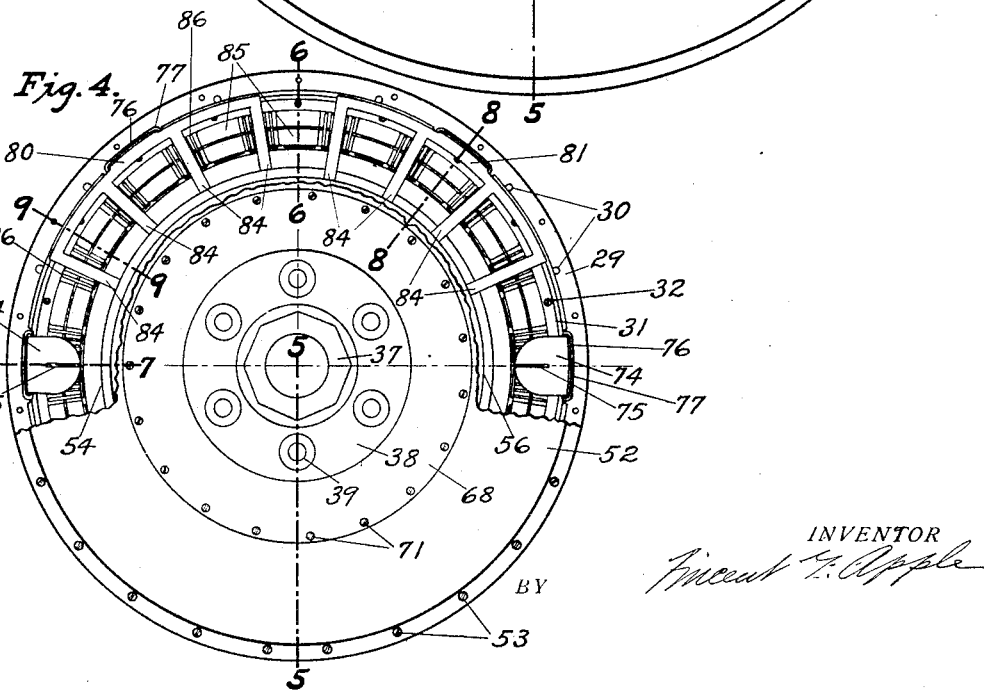
Fig. 4 is similar to Fig. 3 except that the wheel is removed and a part of the motor front-cover is broken away.

I therefore lap connect the field winding by employing the special method which I show and describe in my co-pending application Serial No. 202,138, by which a lap connected winding is arranged in two equal parallel paths as in the ordinary single closed wave winding. This method consists of inserting one hundred eighty-nine conventional hairpin loops 86 with the closed end toward the outside of the wheel, leaving spaces equally divided around the core for thirty-eight special loops. Two terminal loops are then provided which differ from the conventional loops only in being sufficiently longer at the closed end to permit them to be welded to the plate 74 as at 75, Fig. 4. The remaining spaces are then filled with special loops 85 which differ from the conventional loops 86 in that the conventional loops 86 have one leg in each layer of the winding while the special loops 85 have both ends in the same layer. By this method of winding the current is naturally reversed as it proceeds around the core from pole to pole resulting in a winding in two paths from one plate 74 to the other plate 74.

The advantage of the combination disclosed is apparent, since if the armature or field carries an ordinary lap connected winding in thirty-eight parallel paths, it must be composed of many turns per pole of small insulated wire to have a resistance equal to the winding herein employed, and, because of the insulation surrounding each small wire, larger winding apertures are required, and consequently less magnetic material may be had in a given space, resulting in much lower efficiency. On the other hand, if a bar winding of the capacity shown be lap connected in thirty-eight parallel paths, and the voltage employed be correspondingly lowered, the cables conveying current to the motor and all portions of the external circuit must be correspondingly increased, resulting in cable dimensions nineteen times as large as those herein shown. The cables herein employed are of a carrying capacity equal to two conductor bars of the winding, and a cable nineteen times as large would in practice be prohibitive.

The type of field element herein employed provides an exceptionally stiff field which will admit of practically no distortion from armature reaction, first because the manetic material composing a pole (see Fig. 11) is divided into five teeth, 46 to 50 inclusive, by four of the winding apertures, thus preventing a shift of the flux away from its normal course, and second, because, as is well known, any normal lap or wave connected winding as commonly applied to a toothed core, where a turn of such winding encloses several teeth of the core, magnetically saturates the poles of the core, the center tooth of a pole most densely, the teeth adjacent the center tooth less densely, and so on away from the center. The stiffness of the field in the poles of my field element is therefore maintained by the distribution of both the winding and the magnetic material. The tooth 51 between poles is neutralized by the winding so that it carries no flux, and is only maintained to space the winding, being shortened as shown to prevent magnetic leakage from pole to pole. The stiffness of the magnetic field in the structure shown makes it particularly applicable to the present invention, since it is desirable that considerable variation in torque and speed may be had in either direction of running with one and the same brush setting.

A cover 52 fastened by screws 53 to ring 29 encloses the front of the motor and carries the positive brush conducting ring 54 (see Figs. 5, 7 and 8) to which the positive brush holders 55 are riveted, and the negative brush conducting ring 56 to which the negative brush holders 57 are riveted. The metal parts including the brush holders 55 and 57, the conducting rings 54 and 56, and the cover 52 are held spaced apart by rings 58 and 59 and cover lining 60 all of insulating material. The positive brush holders 55 and the negative brush holders 57 are alike except that the tenons 61 of the negative brush holders 57 extend thru, and clear, the positive conducting ring 54 and rivet to the negative conducting ring as shown (see Fig. 5,) while the tenons 22 of the positive brush holders 55 extend only thru the positive conducting ring 54 and are riveted therein, (see Fig. 8). At intervals (see Figs. 7 and 10) rivets 62 extend thru the cover 52, its lining 60, the insulating rings 58 and 59 and the conducting rings 54 and 56, the rivets 62 clearing the conducting rings 54 and 56 but being in contact with the other members, thus holding the entire brush rigging to cover 52.

Flexible leads 63 (see Figs. 5, 8 and 10) extend thru slots 64 to electrically connect brushes 65 to the holders, slots 64 being so placed and so limited in length as to form stops, against which leads 63 may bear to restrain further action of springs 66 when the brushes are sufficiently worn to require renewal.

Since brushes of opposite polarity are relatively close together, fins 67 extend outwardly from brush holders 55 and 57 to prevent possible contact of adjacent leads 63.

A cover 68 (see Fig. 5), having a lining of insulating material 69, and carrying felt dust-washer 70 is fastened to cover 52 by screws 71 and may be removed so that the action of the brushes may be observed while the motor is in operation.

Figure 2:
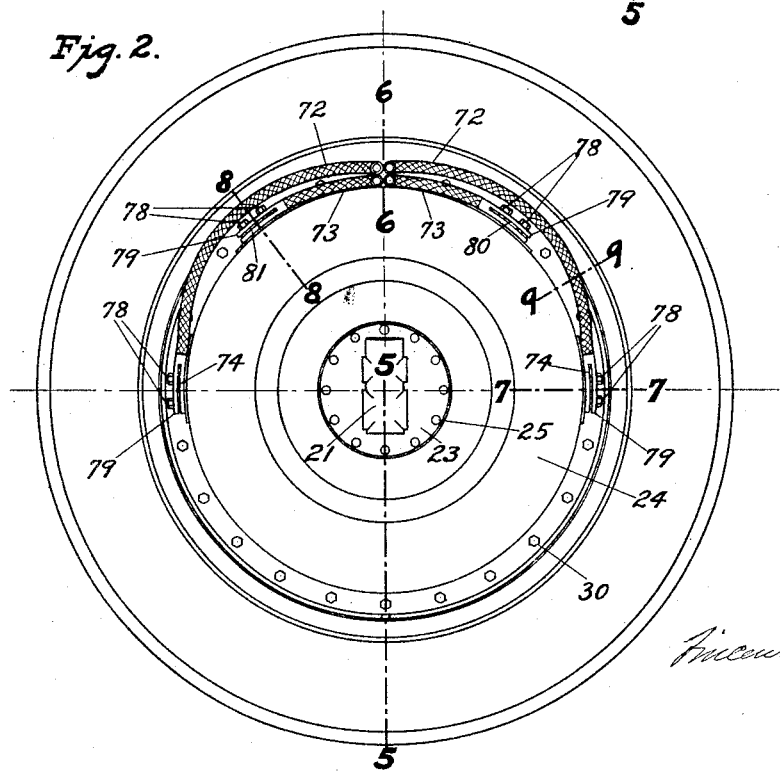
Fig. 2 is similar to Fig. 1 except that the cable cover is removed.
Figure 3:
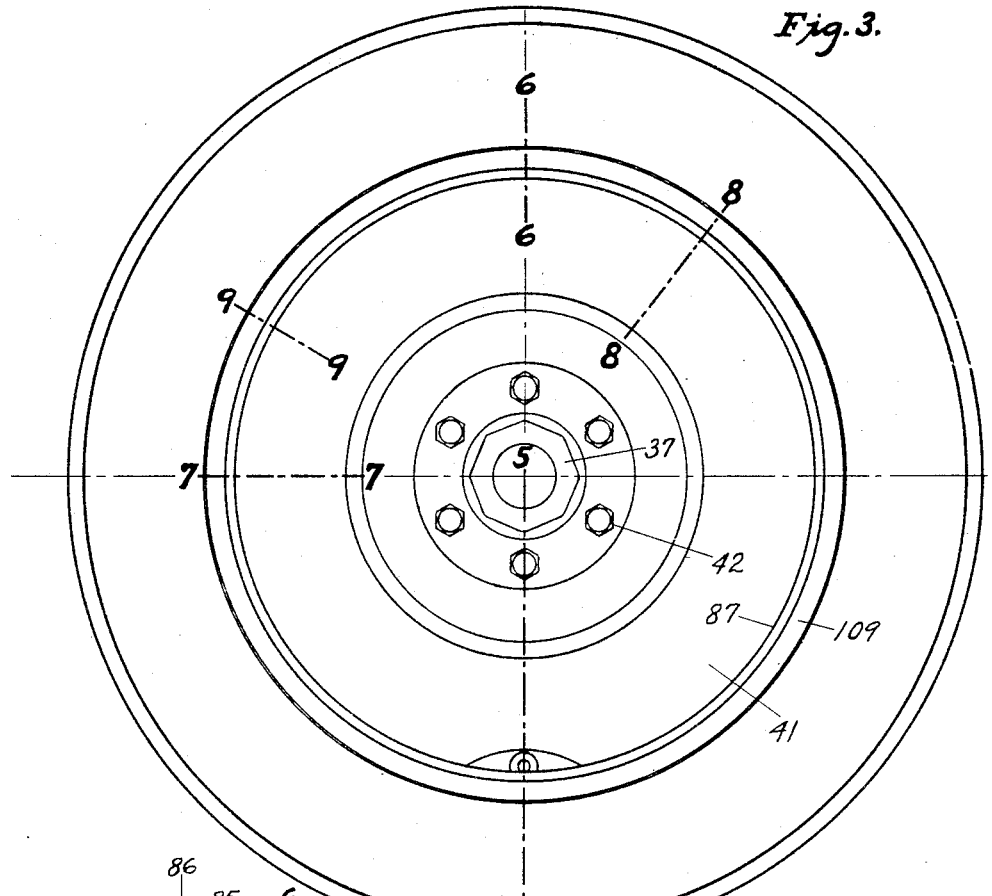
Fig. 3 is an elevation of the complete wheel viewed from the side away from the vehicle.

Since it is desirable that the wheels be operable in either direction, I provide four cables (see Fig. 2) to convey current to the motor, one pair 72, 72 supplying the field winding and another pair, 73, 73 supplying the armature. By means of a suitable controller the direction of the current may thus be reversed in one member, relative to the other, to reverse the motor, as is customary in motors of the series type.

Conducting plates 74, (see Figs 2, 4, 7 and 12) are joined, preferably by welding as at 75, (see Figs. 4 and 7) to opposite points of the field winding and passing thru insulating sleeves 76 and insulating bushings 77, extend from the motor and are clamped by screws 78 to slotted cable-ends 79, current being thus supplied to the field. Conducting plates 80 and 81 (see Figs. 2, 4, 8, 13, 14 and 15) are joined to brush conducting rings 54 and 56 respectively and proceeding thru other insulating sleeves 76 and insulating bushings 77, extend from the motor and are clamped by other screws 78 to other cable-ends 79, current being thus supplied to the armature. By rivets 82, (see Fig. 8) and insulating washer 83, plates 80 and 81 are mechanically joined to, tho electrically insulated from cover 52 so that these plates may be withdrawn from bushing 77 whenever cover 52 is removed. The plates 74, however, are not withdrawn except when the field element is removed from ring 29.

The front ends of plates 80 and 81 are divided into several narrower strips as at 84, 84, etc., (see Figs. 4 and 8) which may occupy the relatively narrow spaces between the ends of the special coils 85, which are required in this particular field winding, thus adding nothing to the width of the motor.

A cover 106 (see Figs. 1, 6, 7, 8, 9 and 14) encloses the cable-ends, and thru hub 107 at its middle portion the cables may be brought out. A conduit 108 (see Figs. 1 and 6) may be held by hub 107 to encase all four cables. Several of the screws 53 (see Fig. 9) instead of extending into tapped holes in ring 29 as in Fig. 6, have clearance thru ring 29 and extend into tapped holes in cover 106 to hold it in position.

The loops 86 (see Figs. 4, 5, 8, etc.) as well as the special loops 85 composing the field winding are closed at, and are endwise entered from, the commutator side of the motor, projecting beyond the core on the other side where they are bent in pairs, the free ends 88 and 89 extending again parallel to the core slots after they pass the bent portions 90 and 91. Pairs of ends 88 and 89 must be joined to complete the field circuit, and since the pairs are relatively close together, circumferentially, and should be joined without loss of cross section in the circuit, I supply a pad 92, of cross section equal to the conductors, for each pair of ends. The pads 92 are laid adjacent to, and crosswise of, the pairs of ends 88 and 89 (see Figs. 13 and 14), and are thus readily accessible at their outer exposed edges for welding with a torch or arc. A lining 93, of insulating material, separates the ends of the winding from cover 24.

The loops 94 composing the armature winding are closed at, and are endwise entered from the side away from the commutator, projecting beyond the core at the commutator side, where they are bent in pairs, the free ends 95 and 96 extending again parallel to the core slots after they pass the bent portions. Pairs of ends 95 and 96 must be joined to complete the armature circuit, and, in order to join them without loss in cross section, I provide commutator segments 99, (see Figs. 5, 7, 8 and 16) having outwardly extending ends 100 of cross section equal to the conductors. The segments 99 are of such thickness and included angle as will provide space for insulating material of uniform thickness 101 between the segments, and the outwardly extending portions 100 are of such thickness and included angle as will provide space for the insulating material between segments as well as space for a pair of conductor ends 95 and 96 adjacent to each segment. The outer exposed edges are thus readily welded by torch or arc.

After the armature circuit is thus completed the armature is preferably placed in a mold and fluid insulating material, or insulating material temporarily made fluid by heat, or otherwise, is poured or pumped into the mold to fill the spaces between the conductor bars and the spaced apart commutator bars, and to cover the windings as at 102, (see Figs. 5, 7, 8 and 16) then hardened or allowed to harden by heat or other means to form a rigid mass with commutator segments exposed at the inner diameter as shown.

The mold should preferably include in its structure spacers extending outwardly between the segments for a short distance to exclude insulating material therefrom so as to form a groove between each pair of segments as at 105, Figs. 5, 10 and 16, and the groove is preferably considerably deeper at the outer edge of the commutator than at the inner edge, so that any dust which may occur from brush wear may work outwardly and away from the core when the motor operates.

That the various parts of the complete structure are readily accessible may be seen by reference to the drawings. The tire may be removed and replaced without removing the wheel, by removing flange 109, or, the entire wheel may be removed and another substituted therefor by removing nuts 42. With the wheel removed, cover 68 may also be removed, so that brushes 65 may be inspected to determine their action while the motor is running. By taking out screws 53 and loosening the screws 78 of two of the cable-ends 79, cover 52 may be withdrawn when it is found necessary that brushes be renewed. With cover 52 withdrawn, the field core and winding may be removed by loosening the other screws 78 of the other two cable-ends 79 and by taking out screws 32, or, the field element including ring 29 may be removed by taking out screws 30. The unit comprising the armature core, its winding and commutator may be withdrawn by taking out screws 44, or this armature unit may be withdrawn along with hub 33 by removing nut 110, (see Fig. 5) when bearings 34 and 35 may be cleaned or renewed or brake lining 111 may be replaced. Any or all parts of the structure may be removed, singly or in assembly, from one and the same position at the outside of the wheel.

Wire, flexible leads and unsoldered or unwelded joints, such as are found in ordinary motor building practice are herein largely eliminated and that without engendering difficulties in assembling or dissembling the several elements. These improvements are of great importance both because of the large volume of current required and the severe service conditions incident to the structure in its application to automotive use.

While in the foregoing description and drawing I have disclosed a structure embodying the principles of my invention, many other structures of modified form may also include these principles. I therefore aim to broadly define what I consider to come within the scope of my invention in the following wherein—

I claim:

1. In an electrically driven wheel adapted for automotive service, a combination essentially comprising, an electric motor stator element, an electric rotor element, a vehicle wheel, a spindle having supporting means on the vehicle at one end, bearings for the rotor and wheel at the other end and a flange member between said supporting means and said bearings, said flange member carrying said stator element, and a hub rotatable on said bearings, said hub having a flange to which said rotor element is attached near the end nearest the vehicle and another flange to which the wheel is removably attached near the end farthest from the vehicle, the wheel being thus removable without disturbing any of the motor parts.

2. In an electric motor driven wheel adapted for automotive service, the combination of a disc wheel having its disc substantially at the outer edge of said wheel and an electric motor of substantially the diameter and width of the space thus provided within said wheel, said motor comprising a stator, a rotor, a non-rotatable flanged spindle and a rotatable hub, said spindle having an opening crosswise therethrough as a means of support on the vehicle at one end, a flange for carrying the stator axially adjacent means of support and bearings for said rotatable hub on the remainder of its length, said rotatable hub having one flange within the motor for carrying the rotor element and another flange nearer the outer end, extending thru the front cover of the motor and having means for attaching or detaching the disc wheel at will.

3. In an electric motor driven wheel, adapted for automotive service, the combination of a vehicle wheel and an electric motor comprising, a spindle having means for support on the vehicle at its inner end, a flange extending outwardly from said spindle axially adjacent said means for support, and bearings for a rotatable hub on its remaining portion, said flange being adapted to carry the stationary members of a friction brake and a stator element for the motor, said hub carrying, within the motor, a brake drum adapted to coact with said stationary members, and a rotor element for said motor, said rotatable hub extending thru the front cover of said motor and having means outside the motor for connection to the vehicle wheel.

4. In an electric motor driven wheel, adapted for automotive service, the combination of a vehicle wheel and an electric motor comprising, a spindle having means for support on the vehicle at its inner end, a flange axially adjacent said means for support, and bearings for a rotatable hub on its remaining portion, said flange being adapted to carry the stationary members of an internal expanding brake near the spindle and a stator element for the motor farther from said spindle, a rotatable hub on said bearings carrying, within the motor, a brake drum, the interior of said drum being adapted to coact with said stationary brake members and the exterior being provided with means for attaching the rotor element of the motor, said hub extending thru the front cover of said motor and carrying means outside the motor for attaching the vehicle wheel.

5. An electric motor driven wheel, adapted for automotive service, comprising a disc wheel having its disc substantially at the outer edge of said wheel and an electric motor of substantially the diameter and width of the space thus provided within said wheel, said motor comprising, a stator, a rotor, a flanged spindle and a hub, said spindle having means for support on the vehicle at one end, a flange adjacent said means for support for carrying the stationary members of an internal expanding brake near said spindle and a stator element for the motor farther out from said spindle, and bearings for said hub on the remainder of its length, said hub carrying, within the motor, a brake drum, the interior of said drum being adapted to coact with said stationary brake members, and the exterior being provided with means for attaching the rotor element of the motor, said hub extending thru the front cover of said motor and carrying means for attaching or detaching the disc wheel at will.

6. The combination in an automotive wheel of a rotatable hub, a flange adapted to carry a disc wheel near the outer end of said hub, a second flange carried by said hub intermediate the first said flange and the inner end of said hub, a drum carried by the second said flange, brake shoes within said drum, adapted to engage said drum to retard rotation of said hub, and an electric motor armature secured to the outside of said drum, adapted to cause rotation of said hub.

7. An electric motor vehicle wheel comprising, a non-rotatable spindle having means for support on the wheel at one end, a flange on said spindle axially adjacent its point of support, bearings for said wheel between said flange and the outer end of said spindle, a rotatable hub supported on said bearings, a rear cover for the motor attached to said flange, an electric motor field element secured to said rear cover, a front cover for said motor attached to said field element, a flange carried by said rotatable hub near its outer end extending through an opening in said front cover and adapted to carry a disc wheel, a second flange carried by said rotatable hub intermediate the first flange and the inner end of said hub, a drum carried by the second said flange, an electric motor armature attached to the outside of said drum, and brake shoes within said drum held against rotation by means supported on said rear cover.

In testimony whereof, I hereunto set my hand.

VINCENT G. APPLE.